US012704464B2

(12) United States Patent
Yadin

(10) Patent No.: US 12,704,464 B2
(45) Date of Patent: Aug. 11, 2026

(54) METHOD AND SYSTEM FOR DETECTING A FALSE ERROR ON A COMPONENT OF A BOARD INSPECTED BY AN AOI MACHINE

(71) Applicant: Siemens Industry Software Inc., Plano, TX (US)

(72) Inventor: Tova Yadin, Mazkeret Batya (IL)

(73) Assignee: Siemens Industry Software Inc., Plano, TX (US)

( * ) Notice: Subject to any disclaimer, the term of this patent is extended or adjusted under 35 U.S.C. 154(b) by 324 days.

(21) Appl. No.: 18/553,652

(22) PCT Filed: Mar. 30, 2021

(86) PCT No.: PCT/IB2021/052622
§ 371 (c)(1),
(2) Date: Oct. 2, 2023

(87) PCT Pub. No.: WO2022/208129
PCT Pub. Date: Oct. 6, 2022

(65) Prior Publication Data
US 2024/0053278 A1 Feb. 15, 2024

(51) Int. Cl.
*G01N 21/88* (2006.01)
*G01N 21/95* (2006.01)

(52) U.S. Cl.
CPC ..... *G01N 21/8851* (2013.01); *G01N 21/9501* (2013.01); *G01N 2021/8874* (2013.01)

(58) Field of Classification Search
CPC ........... G01N 21/8851; G01N 21/9501; G01N 2021/8874; G01N 2021/8883;
(Continued)

(56) References Cited

U.S. PATENT DOCUMENTS 10,436,720 B2 10/2019 He et al.
11,710,034 B2 7/2023 Anderson et al.
11,928,558 B1 * 3/2024 Joshi ...................... G06N 20/00
2006/0078191 A1 * 4/2006 Matsumura ........ G01N 21/8851 382/149

(Continued)

FOREIGN PATENT DOCUMENTS

CN 111091534 A 5/2020
CN 111626319 A 9/2020

(Continued)

OTHER PUBLICATIONS

Belbachir et al., An Automatic Optical Inspection System for the Diagnosis of Printed Circuits Based on Neural Networks, IEEE, Oct. 2005, pp. 680-684, pub. fortieth IAS Annual Meeting, Conference Record of the 2005 Industry Applications Conference, Hong Kong, China.

(Continued)

*Primary Examiner* — Iriana Cruz
(74) *Attorney, Agent, or Firm* — Laurence A. Greenberg; Werner H. Stemer; Ralph E. Locher

(57) ABSTRACT

Systems and a method for detecting a false error in a set of errors detected on components of a board that is inspected by an automated optical inspection (AOI) machine. Input data are received. The input data include data originating from AOI machine's inspection results of a given inspected board marked as failed. A false error detector is applied to the input data. The detector is modeled with a trained function and the detector generates output data. The output data determines whether or not at least one of the component errors that are reported by the AOI machine for the given board is a false error.

20 Claims, 5 Drawing Sheets

(58) Field of Classification Search

CPC ....... G01N 2021/95638; G01N 21/956; G06N 3/0464; G06N 3/09; G06N 20/00; G06N 3/08; G06T 7/0004; G06T 2207/20081; G06T 2207/30108

See application file for complete search history.

(56) References Cited

U.S. PATENT DOCUMENTS

2019/0095800 A1* 3/2019 Asbag ................... G06F 18/243
2019/0107498 A1* 4/2019 Urano .............. G01N 21/95607
2020/0309923 A1* 10/2020 Bhaskaran ............ G01S 7/4802
2020/0334809 A1 10/2020 Vianu et al.
2021/0174200 A1* 6/2021 Huang ................... G06N 3/045

FOREIGN PATENT DOCUMENTS

CN 112420148 A 2/2021
KR 20210025482 A 3/2021
WO WO 2007120280 A2 10/2007

OTHER PUBLICATIONS

Adibhatla et al., Defect Detection in Printed Circuit Boards Using You-Only-Look-Once Convolutional Neural Networks, Electronics Journal, Sep. 22, 2020, pp. 1-16, https://doi.org/10.3390/electronics9091547.

Schwebig et al., Compilation of training datasets for use of convolutional neural networks supporting automatic inspection processes in industry 4.0 based electronic manufacturing, Journal of Sensors and Sensor Systems, Jul. 1, 2020, pp. 167-178, https://doi.org/10.5194/jsss-9-167-2020.

Ulger et al., A Standalone Open-Source System for Optical Inspection of Printed Circuit Boards, IEEE, pp. 105-110, pub. 2019 Signal Processing: Algorithms, Architectures, Arrangements, and Applications (SPA), Poznan, Poland.

* cited by examiner 100
102
104
108
110
111
Processor
Cache/
Bridge
Memory
Graphics
Adapter
Display
106
Expansion
Bus
Interface
114
Lan/WAN/
WiFi
Adapter
112
116
124
118
120
122
Audio
Adapter
Keyboard/
Mouse
Adapter
Disk
Controller
I/O
Adapter
Network
130
Server
140
126
Storage 501
202
511
503
512
515
504
513
514
508
505
505
507
506

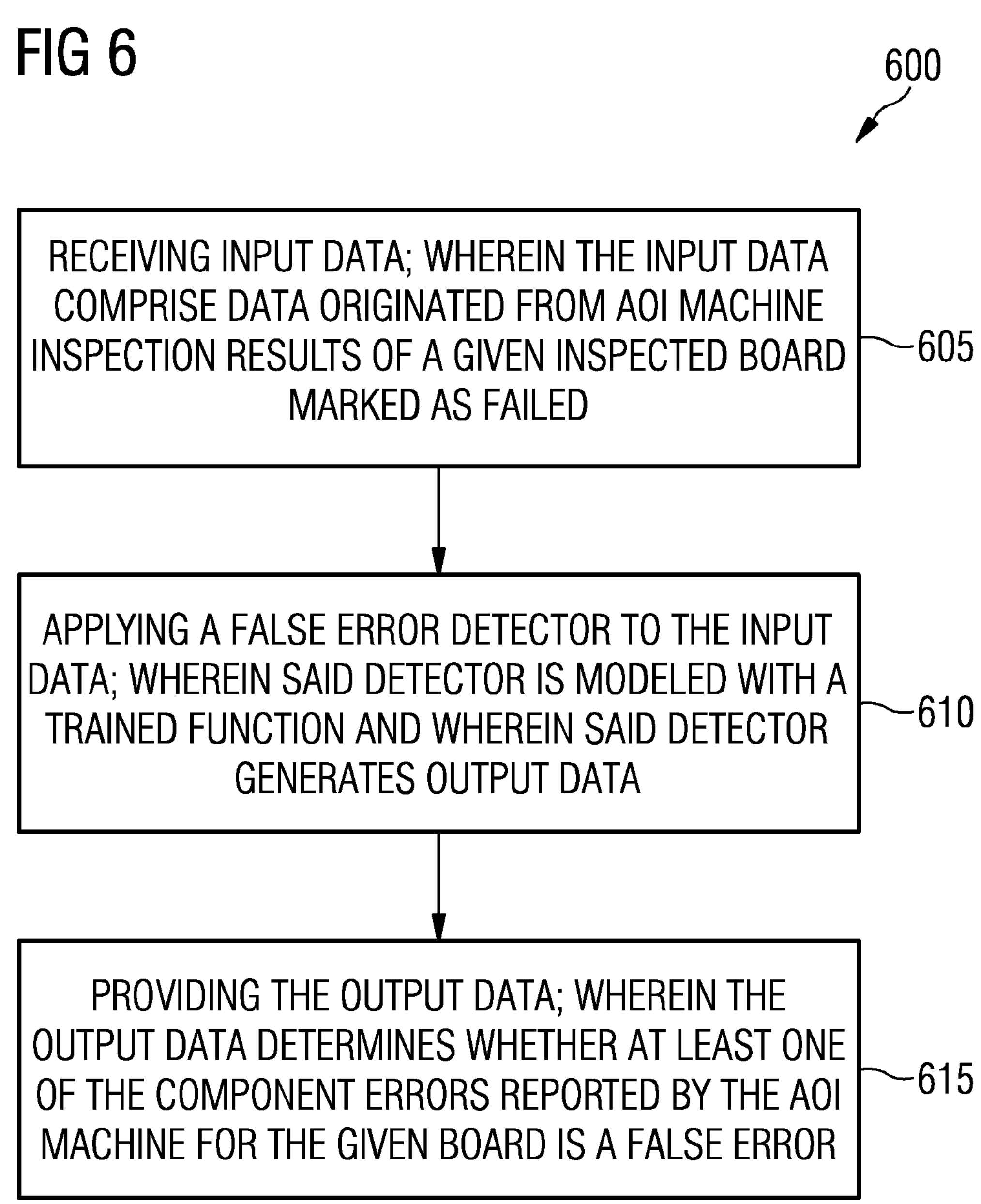
FIG 6
600
RECEIVING INPUT DATA; WHEREIN THE INPUT DATA COMPRISE DATA ORIGINATED FROM AOI MACHINE INSPECTION RESULTS OF A GIVEN INSPECTED BOARD MARKED AS FAILED
605
APPLYING A FALSE ERROR DETECTOR TO THE INPUT DATA; WHEREIN SAID DETECTOR IS MODELED WITH A TRAINED FUNCTION AND WHEREIN SAID DETECTOR GENERATES OUTPUT DATA
610
PROVIDING THE OUTPUT DATA; WHEREIN THE OUTPUT DATA DETERMINES WHETHER AT LEAST ONE OF THE COMPONENT ERRORS REPORTED BY THE AOI MACHINE FOR THE GIVEN BOARD IS A FALSE ERROR
615

METHOD AND SYSTEM FOR DETECTING A FALSE ERROR ON A COMPONENT OF A BOARD INSPECTED BY AN AOI MACHINE

TECHNICAL FIELD

The present disclosure is directed, in general, to computer-aided systems for Printed Circuit Board ("PCB") and Surface-Mount Technology ("SMT") manufacturing and board quality inspection and analysis. More in particular, the disclosure is directed to software systems and applications related to Automated Optical Inspection ("AOI") techniques in the field of PCB and SMT manufacturing.

BACKGROUND OF THE DISCLOSURE

In electronics manufacturing, the testing operations of manufactured PCB/SMT boards are sensitive and critical processes.

In manufacturing facilities of SMT and PCB assembly lines, Automated Optical Inspection ("AOI") machines are usually employed in order to test the quality of the manufactured boards.

Typically, the various different AOI machines of the diverse vendors automatically scan the boards and provide outcome inspection reports with a "PASS" or "FAIL" quality status score for the inspected boards.

The AOI machines typically require an initial configuration of the inspection parameter tolerances. Such initial configuration is preferably dependent on the type of manufactured board and the specific physical characteristics and attributes of the manufactured product.

If the initial parameter tolerances are configured with a "substantially loose" approach, the AOI machine will presumably report a low percentage of failed boards.

The drawback of the "loose" approach is then that, most probably, an unacceptably high number of defected boards will be then delivered to the customers.

As a consequence, in order to keep high quality level standards of the boards delivered to customers, it is often the case that the AOI parameter tolerances are configured with a "considerably strict" approach.

The drawback of the "strict" approach is then that, too many "good quality" boards are mistakenly reported by the AOI machines as failed boards.

Therefore, nowadays, false AOI inspected calls occur unfortunately quite often in SMT and PCB production lines. For example, in some scenarios, up to 80% of the errors reported by the AOI machines might be false errors.

In order to detect such mistakenly AOI-marked failed boards, human quality inspectors are typically employed to visually inspect the allegedly failed boards.

The human quality inspectors provide their inspection quality assessments by evaluating whether the alleged board errors reported by the AOI machines are "TRUE-errors" or "FALSE/PSEUDO-errors".

FIG. 2 schematically illustrates a block diagram of a typical example of a current AOI test process in an electronics manufacturing shop floor (Prior Art).

In the AOI test process 200, a given PCB board 201 is inspected by the AOI machine 202. Machine result reports on component errors detected by the AOI machine 202 on the given board 201 are stored 211 into the quality database 203 for traceability and reporting purposes. Assume, for example, that the AOI machine 202 detected in the given board 201 at least one component with an error, the board 201 is then marked by the AOI machine 202 as a "failed" board. For this faulty board case, the operator 204 starts the human manual review process 212 by inspecting whether the reported component errors detected on the allegedly failed board 201 are true errors (true negative) or false errors (false negative). Assume that the operator 204 assesses that all component errors reported for the board are false errors, than he/she submits 213 to the quality database 203 that the board status should be modified from "fail" status to "pass" status.

Usually, the operator 204 manually inspects, on the physical board 201, each component marked as faulty in the AOI reporting table 205 and then marks inside the same table 205 whether it assesses the alleged component error as a true defect or as a false call. For example, an AOI report table 205, viewed by the human operator 204, may comprise following record types for the inspected boards: board identifier, component identifier, faulty component image 206, defect type, machine inspection result and human visual check result, final inspection result.

Therefore, as shown in the above prior art example, in case all machine detected errors on a given boards are deemed as false errors by the human inspector, the final quality inspection status of the given board is then changed from "fail" status to "pass" status.

The human inspector's work is an expensive and time-consuming task.

Moreover, it causes delay on the electronics factory shop floor.

The alternative solution, i.e. the disposing of all the allegedly failed boards inspected by the AOI machines, is also an expensive solution which reduces the quality, the utilization, and the "first pass yield" quality KPI of an SMT assembly line of the electronics shop floor.

Therefore, techniques for improving the AOI machine testing process are desirable.

SUMMARY OF THE DISCLOSURE

Various disclosed embodiments include methods, systems, and computer readable mediums for detecting one or more false errors among a set of errors detected on components of a board inspected by an AOI machine. A method includes receiving input data; wherein the input data comprise data originated from AOI machine's inspection results of a given inspected board marked as failed. The method further includes applying a false error detector to the input data; wherein said detector is modeled with a trained function and wherein said detector generates output data. The method further includes providing output data; wherein the output data determines whether at least one of the component errors reported by the AOI machine for the given board is a false error.

Various disclosed embodiments include methods, systems, and computer readable mediums for providing a trained function for detecting one or more false errors among a set of errors detected on components of a board inspected by an AOI machine. A method includes receiving input training data, wherein the input training data comprise data originated from AOI-machine's inspection results on components of a given set of AOI machine inspected faulty boards. The method further includes receiving output training data, wherein the output training data comprise data originated from a human inspection assessments on a subset of the component errors determining whether they are false or true errors; wherein the output training data is related to the input training data. The method further includes training a function based on the input training data and the output training data via a Machine Learning ("ML") algorithm. The method further includes providing the trained function for modeling a false error detector.

Various disclosed embodiments include methods, systems, and computer readable mediums for detecting one or more false errors among a set of errors detected on components of a board inspected by an AOI machine. A method includes receiving input training data, wherein the input training data comprise data originated from AOI-machine's inspection results on components of a given set of AOI machine inspected faulty boards. The method further includes receiving output training data, wherein the output training data comprise data originated from a human inspection assessments on a subset of the component errors determining whether they are false or true errors; wherein the output training data is related to the input training data. The method further includes training a function based on the input training data and the output training data via a ML algorithm. The method further includes providing the trained function for modeling a false error detector. The method further includes receiving input data; wherein the input data comprise data originated from AOI machine's inspection results of a specific inspected board marked as failed. The method further includes applying the false error detector to the input data; wherein said detector is modeled with the trained function and wherein said detector generates output data. The method further includes providing output data; wherein the output data determines whether at least one of the component errors reported by the AOI machine for the specific board is a false error.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a flowchart of a method for detecting a false error on a component of a board inspected by an AOI machine in accordance with disclosed embodiments.

DETAILED DESCRIPTION

Figure 1:
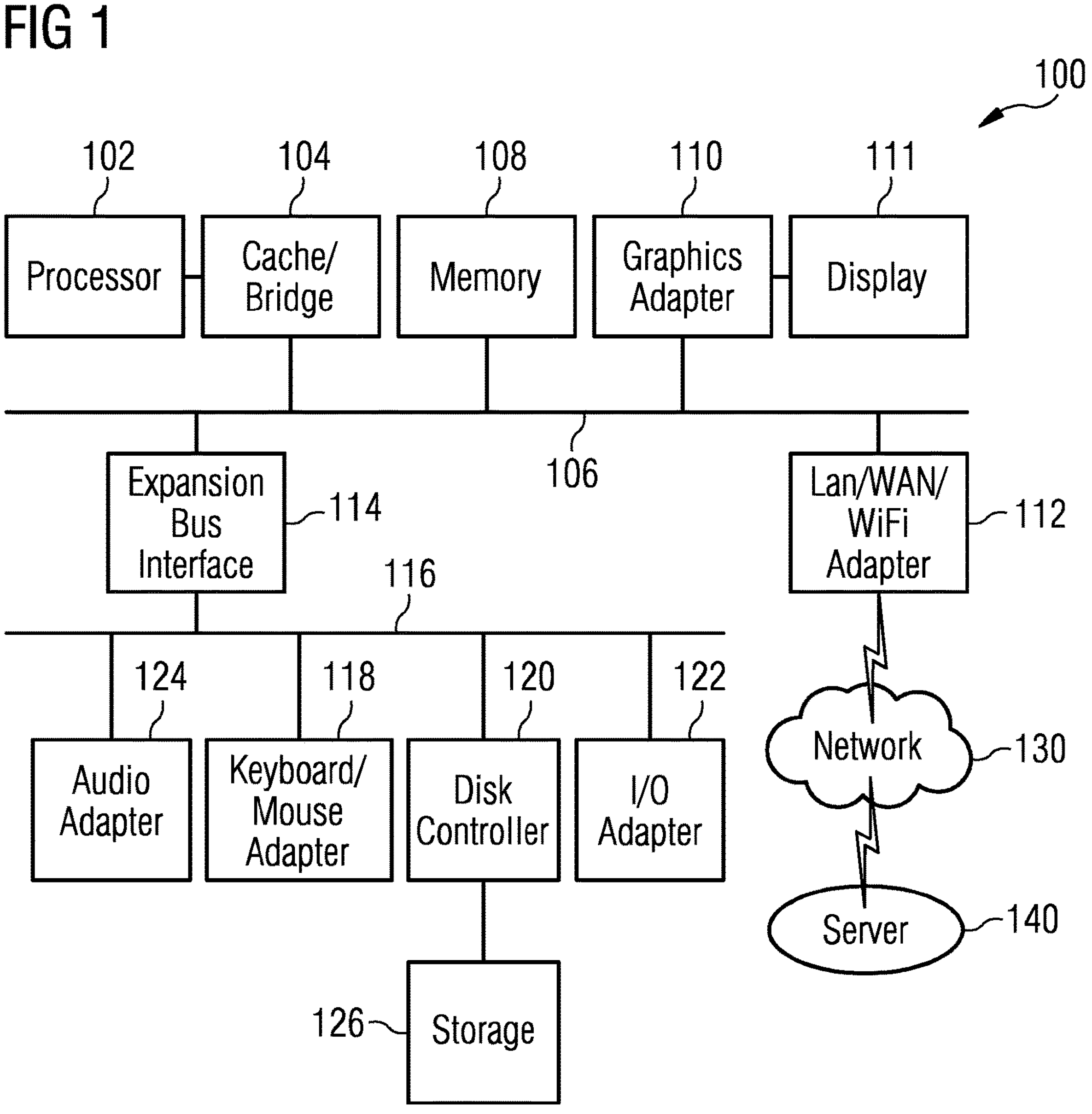
FIG. 1 illustrates a block diagram of a data processing system in which an embodiment can be implemented.
Figure 2:
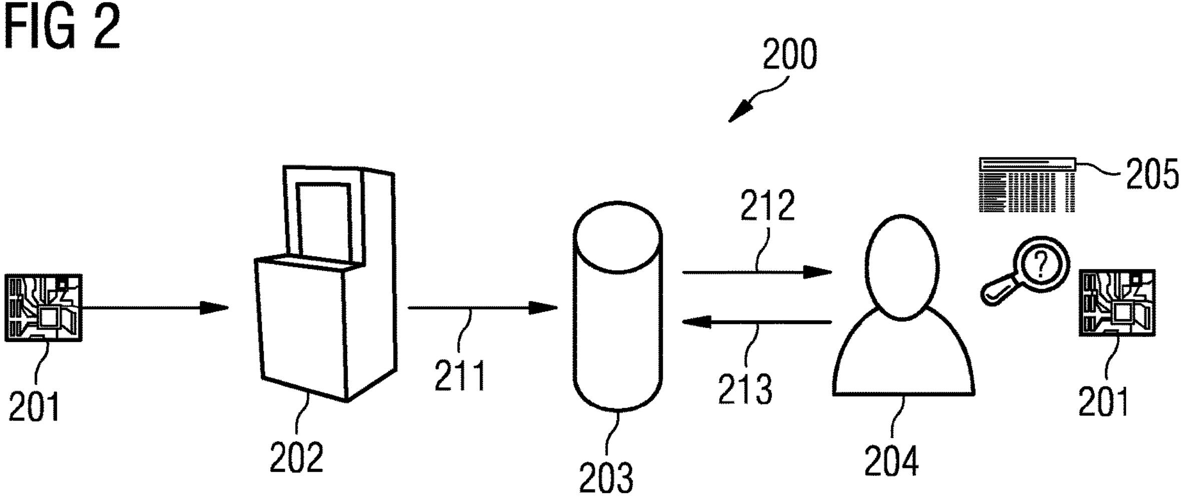
FIG. 2 schematically illustrates a block diagram of a typical example of a current AOI test process in an electronics manufacturing shop floor (Prior Art).

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Furthermore, in the following the solution according to the embodiments is described with respect to methods and systems for detecting a false error in a set of errors detected on components of a board inspected by an AOI machine as well as with respect to methods and systems for providing a trained function for detecting a false error among a set of errors detected on components of a board inspected by an AOI machine.

Features, advantages, or alternative embodiments herein can be assigned to the other claimed objects and vice versa.

In other words, claims for methods and systems for providing a trained function for detecting a false error among a set of errors detected on components of a board inspected by an AOI machine can be improved with features described or claimed in context of the methods and systems for detecting a false error in a set of errors detected on components of a board inspected by an AOI machine and vice versa. In particular, the trained function of the methods and systems for detecting a false error in a set of errors detected on components of a board inspected by an AOI machine can be adapted by the methods and systems for providing a trained function for detecting a false error among a set of errors detected on components of a board inspected by an AOI machine. Furthermore, the input data can comprise advantageous features and embodiments of the training input data, and vice versa. Furthermore, the output data can comprise advantageous features and embodiments of the output training data, and vice versa.

As used herein, the terms "PCB boards", "SMT boards" and simply "boards" denote electronic circuits composed of a plurality of electronic components connected by conductive wires or traces.

Typical examples of electronic components include, but are not limited by, resistors, transistors, capacitors, inductors, and diodes.

As used herein, the term "component" is meant in a broader sense to denote any element or feature of the board, including for example the traces, which can inspected by an AOI machine and then eventually be marked as faulty.

As used herein, the term "component error" broadly denotes "any error or any defect on components and on solder joints and on any other features of the board" including, for example, defects on one or more of the following board features: area defects, billboarding, component offset, component polarity, component presence or absence, component skew, marking, excessive solder joints, flipped component, height defects, insufficient paste around leads, insufficient solder joints, lifted leads, no population tests, paste registration, severely damaged components, tombstoning, volume defects, wrong part, solder bridging, presence of foreign material on the board, line width violations, spacing violation, excess copper, missing pad—a feature that should be on the board is missing, short circuits, gold finger damage, cuts, hole breakage—a drilled hole (via) is outside of its landing pad, wrong mounting components identified, through-hole pins, lifted lead, golden finger scratch/blur (where part of the above examples are taken from the Wikipedia page on AOI machine).

Previous techniques did not enable an efficient AOI machine testing process for PCB boards in an electronics shop floor. The embodiments disclosed herein provide numerous technical benefits, including but not limited to the following examples.

Embodiments reduce the number of false component error calls automatically detected in a board.

Embodiments reduce the several "false negative" results that requires manual operation in the identification which of the negative test report is a "false negative" or a "true negative" one.

Embodiments reduce the number of false "faulty boards" automatically detected in an electronic shop floor.

Embodiments provide a mechanism to judge whether the boards marked as failed by the AOI machines are whether real failures or pseudo failures.

Embodiments reduce the need for manual human operations in the line.

Embodiments increase line efficiency.

Embodiments ensure high quality production levels.

Embodiments increase first pass yields of the PCB production line.

Embodiments achieve important cost reductions by reducing the frequency of calls of false component errors automatically detected in an electronics shop floor.

Embodiments render electronics test operations less sensitive to the initial tolerance configurations performed on the AOI-machines.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Figure 3:
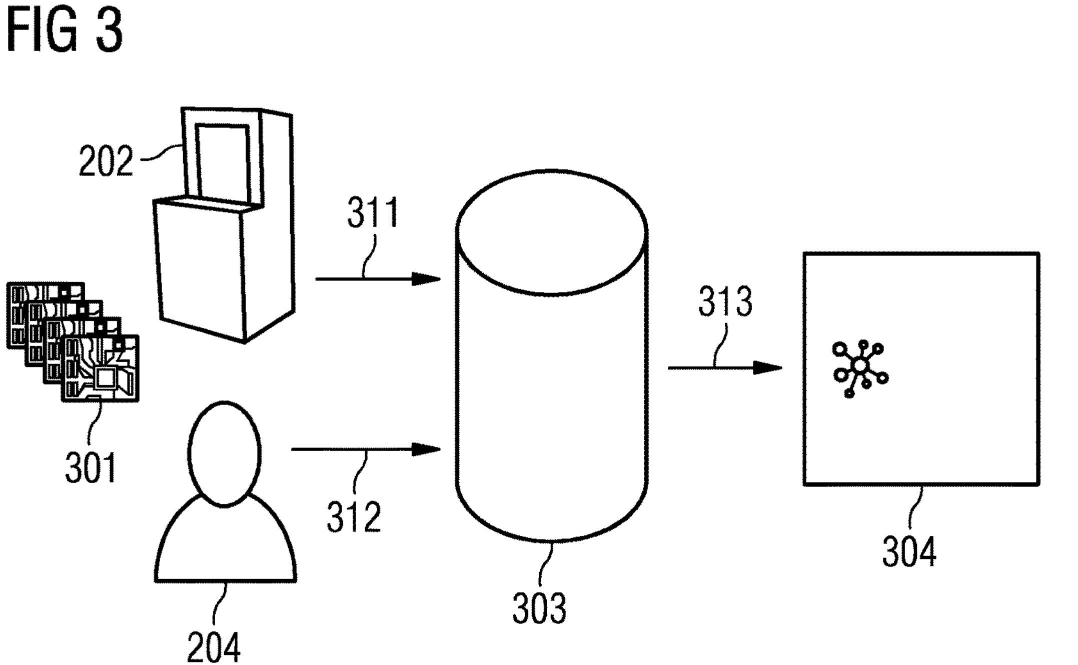
FIG. 3 schematically illustrates a block diagram for training a function with a ML algorithm for modeling a false error detector in accordance with disclosed embodiments.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. FIG. 3 schematically illustrates a block diagram for training a function with a ML algorithm for modeling a false error detector in accordance with disclosed embodiments.

FIG. 3 schematically illustrates a block diagram for training a function with a ML algorithm for modeling a false error detector in accordance with disclosed embodiments.

During the ML training phase, input training data are collected from the inspection results 311 of the AOI machine 202 on a set of boards 301 and output training data are collected from the assessments results 312 of a human operator 204 who visually inspected the boards marked as failed by the AOI machine, in order to assess whether the found component errors are true or false errors. The operator assessment data are the outcome of the operator visual analysis of the board performed on the component errors reported in the AOI machine result data. The rich data machine inspection results and the related human assessments on the AOI machine detected component errors are collected and used, respectively, as input and output training data 313 to train via, the ML training module 304, a function (not shown) via a machine learning ("ML") algorithm.

The ML training module 304 outputs (not shown) the trained function (not shown). The trained function is then used to model the false error detector module 404 of FIG. 4.

The input training data and the output training data are collected, respectively, from the results of the AOI machine board inspections and from the corresponding human visual inspection assessments and are preferably stored in the quality database, as described in the below exemplary embodiment.

The AOI machine 202 outputs inspection results on the inspected boards, such inspection results comprise vast inspection data on the inspected board.

In embodiments, AOI inspection results data include, but are not limited by, data on values and range values on parameters and properties measured on board components, data on board features, image data taken on board features and components, detected defects or component errors.

The AOI inspection results and reports also include data and records on defects or component errors detected in each inspected board 301. In embodiments, the number of component errors detected by the AOI machine may depend on the initially configured parameter tolerances. In embodiments, description of the component error type is included in the AOI inspection result data. Each board, which comprises at least one component error, is usually marked as "failed board" from the machine inspection. The AOI machine reporting data are stored in the quality database 303.

In embodiments, the human operator 204 visually inspects each board marked as failed by analyzing each alleged component error as received (not shown) from the machine reported data stored in the quality database 303. For example, the human operator 204, by visually inspecting the allegedly failed board, analyzes whether each component error reported in the machine reported data (not shown) is a true or false error. The operator then marks 312 her/his visual inspection results in an assessment record for the visually inspected component, such operator assessment results are stored in the quality database 303. In embodiments, or each visually inspected component, the operator assessment record is associated to corresponding component error record reported by the AOI machine. In other words, the operator provides her/his visual inspection assessments by marking, in a corresponding assessment record, which error component is a "true error" and which error component is a "false error".

In the training module 304, a function is trained with a ML algorithm with input training data 313 and output training data 313.

The input training data comprises data originated from the AOI machine's inspection results on component of a given set of AOI-machine inspected faulty boards.

The output training data comprise data originated from a human inspection assessments on a subset of the machine detected component errors; such assessment outcomes denoting whether the machine-detected component error are false or true errors; the output training data relate to the input training data. In fact, the human assessment outcome data of the output training data relate to the component errors of the input training data.

In embodiments, examples of input training data comprise, but are not limited by, measurements of feature and component boards such as, e.g., geometrical information on parameters typically measured on board component images taken by the AOI machine. Examples of such parameters include but are not limited by: (X,Y) location of a component, dimension (width, height, length), polarity, brightness, pad area, offset of the components on the board, offset angle, minimum and maximum value limits for all the above, rotation of the component, lead bridging, lead planarity, center X, Center Y, volume, area.

Input training data are collected from the AOI inspection result data. In embodiments, the AOI inspection result data are processed by a data neutralizer and then provided as input training data.

The output training data are collected from the operator assessment outcomes reported by the operator on the alleged component errors as reported by the AOI machine. In embodiments, the assessment outcomes are processed by a data neutralizer and then provided as input training data.

In embodiment, the input/output training data comprise data in numerical format, in text format, in other format and/or in any combination thereof.

Machine and operator reporting data may be contained in reporting files e.g. xml, csv, txt, jpg, and other formats.

For example, the input training data and the output training data may be contained in the same reporting Excel file which combine, in different fields of the same record, machine inspection results and operator final decision with assessments on false and true component errors.

In embodiments, input training data may comprise additional environmental data. Examples of environmental data include data collected by sensors on the line, e.g. sensor measuring temperature, humidity, noise, air pressure, oxidation etc.

In embodiments, during the training phase with training data, the trained function can adapt to new circumstances and to detect and extrapolate patterns.

In general, parameters of a trained function can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules.

In particular, a neural network can be a deep neural network, a convolutional neural network, or a convolutional deep neural network. Furthermore, a neural network can be an adversarial network, a deep adversarial network and/or a generative adversarial network.

In embodiments, the ML algorithm is a supervised model, for example a binary classifier which is classifying between true and pseudo error. In embodiments, other classifiers may be used for example logistic regressor, random forest classifier, xgboost classifier etc. In embodiments, a feed forward neural network via TensorFlow framework may be used.

Figure 4:
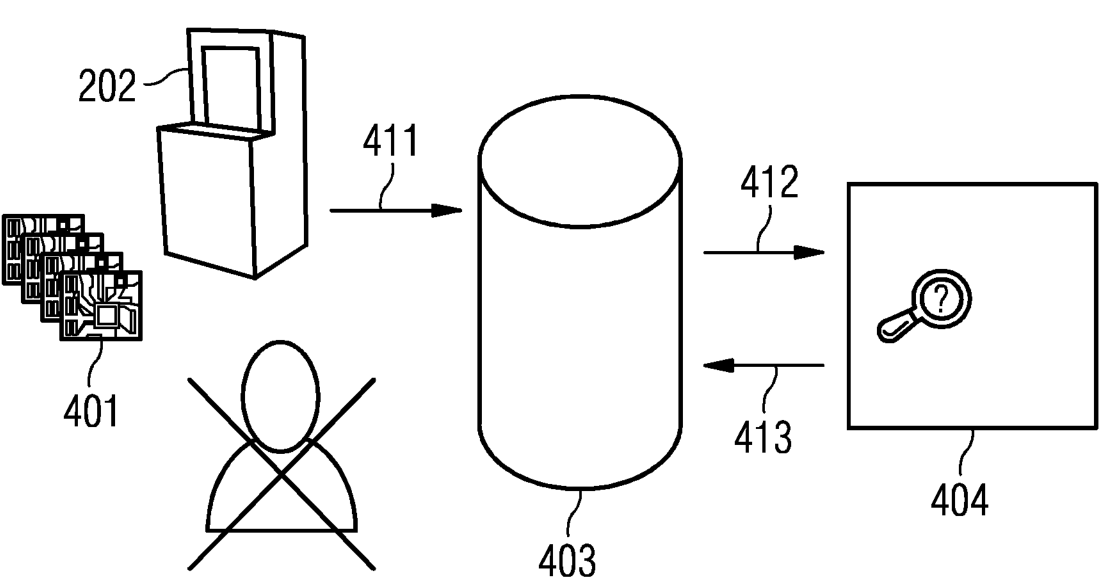
FIG. 4 schematically illustrates a block diagram for detecting a false error on a component of a board inspected by an AOI machine in accordance with disclosed embodiments.

FIG. 4 schematically illustrates a block diagram for detecting a false error ("FE") on a component of a board inspected by an AOI machine in accordance with disclosed embodiments.

The FE detector module 404 is modeled with a function trained via a ML algorithm, as for example outlined in the exemplary embodiment of FIG. 3.

A set of boards 401 is inspected by an AOI machine 202. The AOI inspection results 411 are stored in the quality database 403. The inspection results of the alleged faulty boards are applied as input data 412 to the FE detector 404. The FE detector 404 determines whether one or more of the component errors for each allegedly failed board is a false component error. When in an alleged failed board, all its AOI machine inspected component errors are deemed as false errors by the FE detector 404, then the status of the board is changed from "failed status" to "passed status".

Advantageously, the FE detector module 404 automatically assesses whether alleged component errors of boards marked as failed by the AOI machine are true or false errors.

In embodiments, the output 413 of the FE detector 404 may be provided as a report for example containing the list of the boards whose status changed from "fail" to "pass".

Figure 5:
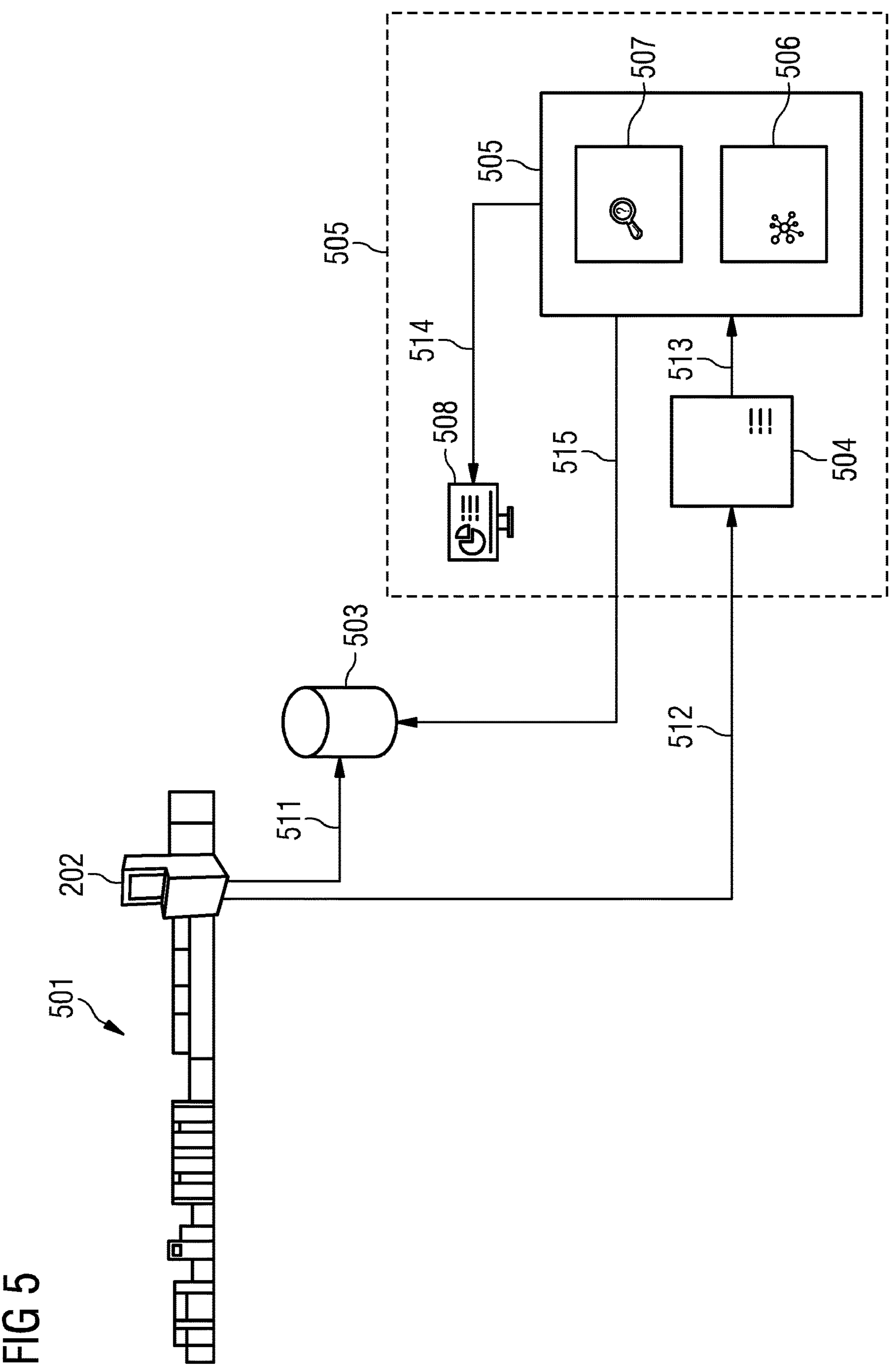
FIG. 5 schematically illustrates a block diagram of an exemplary AOI test process in an electronics manufacturing shop floor in accordance with disclosed embodiments.

FIG. 5 schematically illustrates a block diagram of an exemplary AOI test process in an electronics manufacturing shop floor in accordance with disclosed embodiments.

In the shop floor's production line 501, boards (not shown) are manufactured and then inspected by the AOI machine 202. As the skilled person knows, the AOI machine can be placed at different stages of a production line.

The exemplary ML component 505, hereby depicted for illustration purposes only, may contain only one subcomponent—i.e. the ML trainer 506 only or the FE detector 507 only or, alternatively it may contain both subcomponents—i.e. both the ML trainer 596 and the FE detector 507 which may be in communication with each other (not shown).

Dashed line 505 schematically delimits the deployment location of the various entities, e.g. the ML component 505, the data neutralizer 504 and the customer interface 508 for the purpose of illustrating several embodiments of architectural deployments.

The deployment location 505 may include one or more of the shop floor site, the edge, the client, the server, the cloud, any other location, or any combination thereof.

In the embodiment of FIG. 5, the quality database is located in the shop floor. In other embodiments, the quality database 503 maybe be located inside the deployment location 505.

In other embodiments, the quality database 503, the data neutralizer 504, the customer interface 508 and each of the ML subcomponent 505, 507 may be deployed each one in a different separate location.

The ML training phase is performed by the ML trainer 506 and its output (not shown) is a trained function for modeling the FE detector 507.

The FE detection phase is performed by the FE detector 507 and its output automatically determines whether at least one component error reported by the AOI machine for a specific board is a false error.

In embodiments, the training phase may be performed in the same or similar shop floor with same types of boards, same or similar production lines and same or similar AOI machine as employed during the FE detection phase.

In other embodiments, the ML training phase is performed in or more differing conditions: e.g. other shop floor, other production line, other types of boards, other AOI machine type. Other AOI machine types may include machines of same or different vendors and a combination of more machines of same or different types.

Exemplary Embodiment of ML Training Phase

A set of boards (not shown) manufactured in a production line 501 are inspected by the AOI machine 202.

Typically, during operations, the board AOI machine inspection results together with corresponding human operator (not shown) assessments on faulty components are stored 511 in the quality database 503. Such data stored in the database 503 may be collected (not shown) to be used as input and output training data for the ML trainer 506. In other embodiments, the input and output training data of the ML trainer 507 are collected directly from the AOI machine inspection results 512 and from the human operator assessments (not shown). In embodiments, the data neutralizer 504 may be used to pre-process the training (input and/or output) data of the ML trainer 506. In embodiments, the data neutralizer 504 is a module which translates the input data with a proprietary input language/format to output data in a neutral language/format. In embodiments, the data neutralizer 504 processes the training data so as to render them as "standard/global" and as "general" as possible by removing proprietary and specific formatting and information.

The training process is performed by the ML trainer 506. The ML trainer receives input training data and corresponding output training data, it trains a function based on the input training data and the corresponding output training data via a ML algorithm and it provides a trained function for modeling the FE detector 507.

In embodiments, the ML trainer 506 employs a predefined ML algorithm. In embodiments, the ML trainer 506 may employ a customizable ML algorithm.

Exemplary Embodiment of FE Detection Phase

A set of boards (not shown) manufactured in a production line 501 are inspected by the AOI machine 202. The AOI machine inspection results are stored 511 in the quality database 503. Data originated from the AOI machine inspection results are applied as input data 513 of the FE detector 507 to determine whether allegedly found component errors are true errors or false errors. The false error detector 507 is modeled with a trained function. In embodiments, the reports of the FE detector 507 are stored 515 in the quality database and associated to the corresponding AOI machine reports. In embodiments, the reports of the FE detector 507 are sent 514 to a customer interface 504 for visualization. In embodiments, the data originated from the AOI machine inspection results are processed by a data neutralizer 504. The data neutralizer 504 is preferably used if the same or other data neutralizers 504 were already used during the training phase.

The training process performed by the ML trainer module 506 is based on input training data and output training data (not shown) collected during a training phase. In embodiments, the training phase can be done in the same production line 501 with a set of AOI inspected boards and corresponding assessments of an operator (not shown). In embodiments, the model of the FE detector 507 is obtained by a ML training module previously trained with AOI machine results received from boards of similar or same product boards.

In embodiments, the model of the FE detector 507 can be updated upon receiving a new trained function from the ML trainer 506 or from any other data sources.

In embodiments, the training phase can be performed in the same conditions, e.g. same board types, same production line, AOI machine, data neutralizer, than the conditions present during the FE detection phase.

In embodiments, the conditions of the ML training phase and of the FE detection phase are similar, e.g. same board types, same production line, AOI machine, data neutralizer.

In embodiments, at least one conditions of the ML training phase and of the FE detection phase differ, e.g. different board types, different production lines, different AOI machine, different data neutralizer.

In embodiments, not shown, the ML trainer 506 uses input and output training data collected by a large variety of different boards and by a large variety of AOI machine vendors with different initial configurations and provide a trained function for modeling a "general purpose" FE detector 507 which is capable of detecting false errors independently of the type of AOI machine, independently of the type of manufactured board, independently of the type of initial AOI machine tolerance configurations and independently of other conditions.

In embodiments, the function for modeling a general purpose FE detector 507 may be retrieved (not shown) and retrained by the ML trainer 506 with input and output training data of the specific production line 501 so as to obtain a newly customized trained function for modeling a customized false error detector 507.

In embodiments, both the ML training phase and the FE detection phase may be performed with data resulting from two or more AOI machines, preferably of different AOI vendors or different types.

In embodiments, outputs from different AOI machines may be combined and analyzed to improve the FE detector model.

In embodiments, a pre-trained model for the FE detector may be used in the training phase as a starting point. Advantageously, the training phase may be faster.

In embodiments, the output results of the FE detector enable to determine one or more specific board that were allegedly marked as faulty by the AOI machine, e.g. when all the alleged component errors of the same specific board were assessed as false component errors by the FE detector.

In embodiments, the output results of the FE detector may be post-processed by a manufacturing execution system. In embodiments, the output results of the FE detector may be provided as a feedback/loop to other modules.

In embodiments, the output results of the FE detector may to the quality database or to Manufacturing Execution System ("MES") or Manufacturing Operation Management ("MOM") system or any manufacturing software system related to the production processes of the shop floor. Based on the received outcome provided by the FE detector, any of such software systems o modules may determine one or more production action modifications, improvements and/or production fine tunings. For example, in case of false faulty board, the pass to the following station may be allowed without need for a stop for the specific boards falsely marked as faulty board by the AOI machine. In embodiments, this operation may preferably be controlled directly by a routing control engine of the manufacturing production processes.

In embodiments, the ML component 505, with one or both sub-components 506, 507 may be packaged for cloud or for edge deployment or any combination thereof. In embodiments, the ML trainer may comprise a set of customizable ML algorithms which can be used independently or in combination. In embodiments, the FE detector may comprise a pre-trained model which can be updated with production data by the ML trainer or by other data sources. In other embodiments, the FE detector may be modeled as a combination of different trained functions. In embodiments, the input training data and the output training data of the ML trainer 506 may be composed from data collected in different manufacturing scenarios. In embodiments, the input training data and the output training data of the FE detector 507 may be composed from data collected in different manufacturing scenarios.

Although exemplary embodiments of architectures have been described in FIG. 5, those skilled in the art will understand that various changes, substitutions, variations, and improvements may be made without departing from the scope of the disclosure in its broadest form.

FIG. 6 illustrates a flowchart of a method for detecting a false error on a component of a board inspected by an AOI machine in accordance with disclosed embodiments. Such method can be performed, for example, by system 100 of FIG. 1 described above, but the "system" in the process below can be any apparatus configured to perform a process as described.

At act 605, input data are received. The input data comprise data originated from AOI machine's inspection results of a given inspected board marked as failed from the AOI machine's inspection.

At act 610, a false error detector is applied to the input data. The false error detector is modeled with a trained function and wherein the detector generates output data.

At act 615, output data is provided. The output data determines whether at least one of the component errors reported by the AOI machine for the given board is a false error. In embodiments, if all or a relevant subset of all the AOI-machine component errors are determined to be false errors, then the status of the given board can b changed from "fail" to "pass".

In embodiments, the data originated from AOI machine's inspection results may conveniently comprise component parameter data selected from the group consisting of: geometrical parameter data; (X,Y) location parameter data; dimension parameter data (e.g. width, height, and/or length); polarity parameter data; brightness parameter data; pad area parameter data; offset parameter data; offset angle parameter data; rotation parameter data; lead bridging parameter data; lead planarity parameter data; center X, center Y parameter data; volume parameter data; area parameter data. In embodiments, minimum and maximum value limits and ranges for any of the above parameter data may be included as input data. In embodiments, the component parameter data are measured on the inspected board by the AOI machine.

Advantageously, with embodiments, some of the parameter data from the inspected AOI machine are utilized as part of the board test process whereas such data were previously not usable by a human inspector.

In embodiments, the input data may advantageously comprise environmental parameter data selected from the group consisting of: temperature parameter data; humidity parameter data; noise parameter data; vibration parameter data; air pressure parameter data. In embodiments, the environmental parameter data may preferably be obtained via measurements of sensors.

In embodiments, the provided output data are used by a manufacturing execution system to determine and control the execution of at least one production process modification.

In embodiments, the input data are pre-processed by a data neutralizer.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for detecting, by a data processing system, one or more false errors among a set of errors detected on components of a board inspected by an automated optical inspection (AOI) machine, the method comprising:

receiving input data; the input data comprising data originating from inspection results of the AOI machine of a given inspected board that is marked as failed;

applying a false error detector to the input data; the detector being modeled with a trained function via a machine learning (ML) algorithm and the detector generating output data, the trained function being trained with input training data and output training data, the input training data including data originating from the AOI machine's inspection results on components of a given set of AOI machine inspected faulty boards and the output training data including data originating from human inspection assessments on a subset of component errors of the given set that determine whether the component errors are false or true errors;

providing output data; the output data determining whether at least one component error reported by the AOI machine for the given inspected board is a false error.

2. The method according to claim 1, wherein the data originating from the inspection results comprise component parameter data selected from the group consisting of:

geometrical parameter data;
(X,Y) location parameter data;
dimension parameter data;
polarity parameter data;
brightness parameter data;
pad area parameter data;
offset parameter data;
offset angle parameter data;
rotation parameter data;
lead bridging parameter data;
lead planarity parameter data;
center X, center Y parameter data;
volume parameter data; and
area parameter data.

3. The method according to claim 2, wherein the dimension parameter data are selected from the group consisting of width, height, and length.

4. The method according to claim 1, wherein the input data comprise environmental parameter data selected from the group consisting of:

temperature parameter data;
humidity parameter data;
noise parameter data;
vibration parameter data; and
air pressure parameter data.

5. The method according to claim 1, which comprises using the output data by a manufacturing execution system to determine and control an execution of at least one production process modification.

6. The method according to claim 1, which comprises preprocessing the input data by a data neutralizer.

7. The method according to claim 1, which comprises obtaining the input data originated from the inspection results of a given inspected board marked as failed by combining inspection results of more than one AOI machine.

8. The method according to claim 1, further comprising the steps of providing the output data from the false error detector to a manufacturing execution system or a manufacturing operation management system or to another manufacturing software system related to the production processes of a shop floor; and determining at least one production process modification based on the provided output data and executing the determined at least one production process modification.

9. A data processing system, comprising:

a processor; and an accessible memory, the data processing system particularly configured to:

receive input data; wherein the input data comprise data originated from AOI machine's inspection results of a given inspected board marked as failed;

apply a false error detector to the input data; wherein said detector is modeled with a trained function via an ML algorithm and wherein said detector generates output data, the trained function being trained with input training data and output training data, the input training data including data originating from the AOI machine's inspection results on components of a given set of AOI machine inspected faulty boards and the output training data including data originating from human inspection assessments on a subset of component errors of the given set that determine whether the component errors are false or true errors;

provide output data; wherein the output data determines whether at least one of the component errors reported by the AOI machine for the given board is a false error.

10. The data processing system according to claim 9, wherein the data originating from the inspection results comprise component parameter data selected from the group consisting of:

geometrical parameter data;
(X,Y) location parameter data;
dimension parameter data;
polarity parameter data;
brightness parameter data;
pad area parameter data;
offset parameter data;
offset angle parameter data;
rotation parameter data;
lead bridging parameter data;
lead planarity parameter data;
center X, center Y parameter data;
volume parameter data; and
area parameter data.

11. The data processing system according to claim 10, wherein the dimension parameter data are selected from the group consisting of width, height, and length.

12. The data processing system according to claim 9, wherein the input data comprise environmental parameter data selected from the group consisting of:

temperature parameter data;
humidity parameter data;
noise parameter data;
vibration parameter data; and
air pressure parameter data.

13. The data processing system according to claim 9, wherein the output data provided by the data processing system are configured for use by a manufacturing execution system to determine and control an execution of at least one production process modification.

14. The data processing system according to claim 9, which further comprises a data neutralizer for preprocessing the input data.

15. The data processing system according to claim 9, wherein the data processor system is further configured to:

provide the output data from the false error detector to a manufacturing execution system or a manufacturing operation management system or to another manufacturing software system related to the production processes of a shop floor; and determine at least one production process modification based on the provided output data and execute the determined at least one production process modification.

16. A non-transitory computer-readable medium encoded with executable instructions that, when executed, cause one or more data processing systems to:

receive input data, the input data comprising data originating from inspection results by an automated optical inspection (AOI) machine of a given inspected board that is marked as failed;

apply a false error detector to the input data, the false error detector being modeled with a trained function via an ML algorithm and being configured to generate output data, via a machine learning (ML) algorithm and the detector generating output data, the trained function being trained with input training data and output training data, the input training data including data originating from the AOI machine's inspection results on components of a given set of AOI machine inspected faulty boards and the output training data including data originating from human inspection assessments on a subset of component errors of the given set that determine whether the component errors are false or true errors; and provide output data, the output data determining whether at least one component error reported by the AOI machine for the given board is a false error.

17. The computer-readable medium according to claim 16, wherein the data originating from the inspection results by the AOI machine comprise component parameter data selected from the group consisting of:

geometrical parameter data;
(X,Y) location parameter data;
dimension parameter data;
polarity parameter data;
brightness parameter data;
pad area parameter data;
offset parameter data;
offset angle parameter data;
rotation parameter data;
lead bridging parameter data;
lead planarity parameter data;
center X, center Y parameter data;
volume parameter data; and
area parameter data.

18. The computer-readable medium according to claim 17, wherein the dimension parameter data are selected from the group consisting of width, height, and length.

19. A method for providing, by a data processing system, a trained function for detecting one or more false errors among a set of errors detected on components of a board inspected by an automated optical inspection (AOI) machine, the method comprising:

receiving input training data, the input training data comprising data originating from inspection results by an AOI machine on components of a given set of AOI machine-inspected faulty boards;

receiving output training data, the output training data comprising data originating from a human inspection assessment on a subset of the component errors determining whether the errors are false or true errors; wherein the output training data is related to the input training data;

training a function based on the input training data and the output training data via a machine learning (ML) algorithm; and providing the trained function for modeling a false error detector.

20. A method for detecting, by a data processing system, one or more false errors among a set of errors detected on components of a board inspected by an automated optical inspection (AOI) machine, the method comprising:

receiving input training data, the input training data comprising data originating from inspection results of an AOI machine inspection on components of a given set of AOI machine-inspected faulty boards;

receiving output training data, the output training data comprising data originating from human inspection assessments on a subset of the component errors determining whether the errors are false or true errors; wherein the output training data is related to the input training data;

training a function based on the input training data and the output training data via a machine learning (ML) algorithm, to form a trained function;

providing the trained function for modeling a false error detector;

receiving input data, the input data comprising data originating from the inspection results of the AOI machine inspection of a specific inspected board marked as failed;

applying the false error detector to the input data; wherein the detector is modeled with the trained function and wherein the detector generates output data; and providing the output data which determine whether at least one of the component errors reported by the AOI machine for the specific inspected board is a false error.

* * * * *